March 23, 1943.  E. P. DRAKE ET AL  2,314,484
METERING AND ALIGNING MACHINE
Filed March 6, 1940  8 Sheets-Sheet 1

Inventors
EDWARD P. DRAKE,
FRED J. ALBERTY,
WILLIAM H. KAGLEY,
By
Attorney

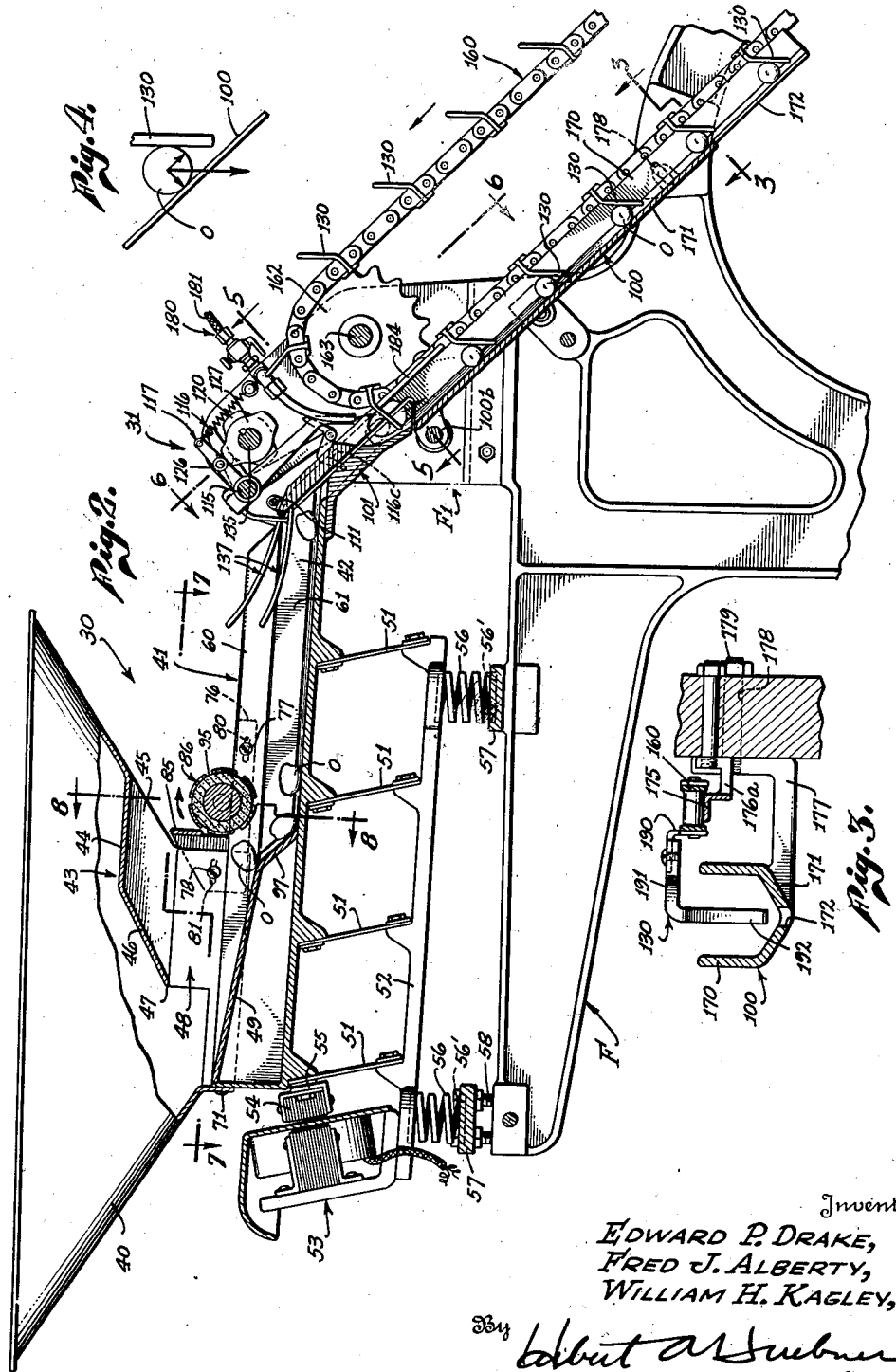

March 23, 1943.　　　E. P. DRAKE ET AL　　　2,314,484
METERING AND ALIGNING MACHINE
Filed March 6, 1940　　　8 Sheets-Sheet 3

EDWARD P. DRAKE,
FRED J. ALBERTY,
WILLIAM H. KAGLEY,
INVENTORS

BY
ATTORNEYS

March 23, 1943.   E. P. DRAKE ET AL   2,314,484
METERING AND ALIGNING MACHINE
Filed March 6, 1940   8 Sheets-Sheet 4

Inventors
EDWARD P. DRAKE,
FRED J. ALBERTY,
WILLIAM H. KAGLEY,
By
Attorney

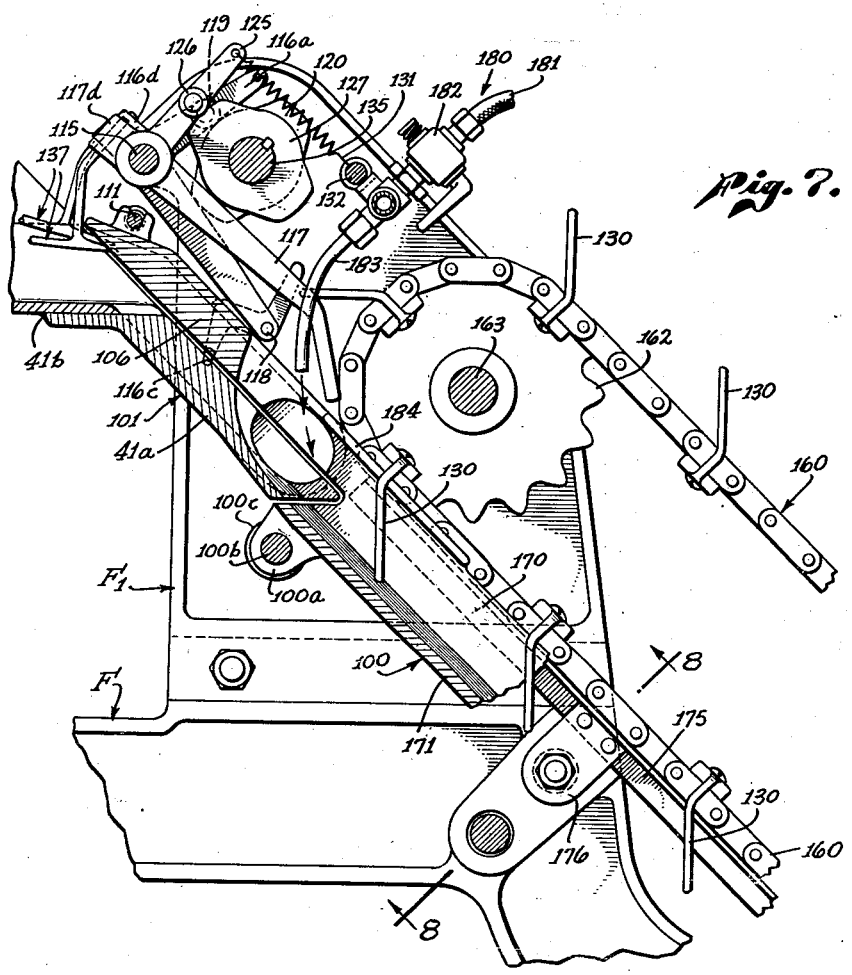
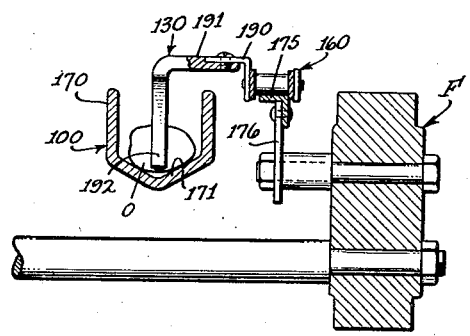

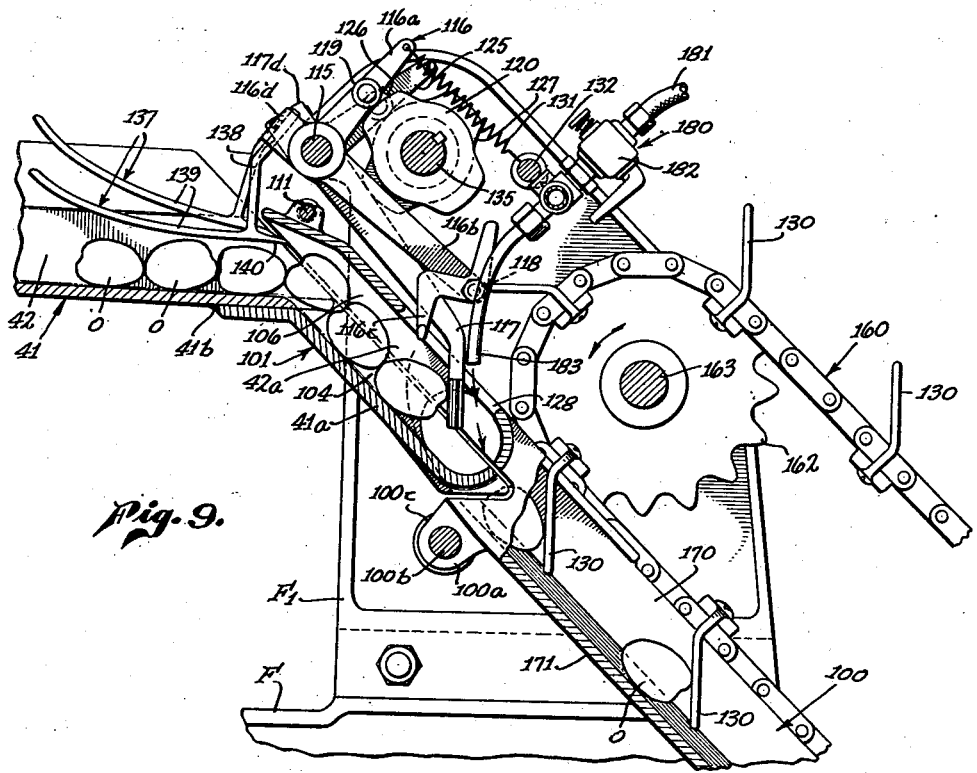

Inventors
EDWARD P. DRAKE,
FRED J. ALBERTY,
WILLIAM H. KAGLEY,
Attorney

March 23, 1943.  E. P. DRAKE ET AL  2,314,484
METERING AND ALIGNING MACHINE
Filed March 6, 1940   8 Sheets-Sheet 8
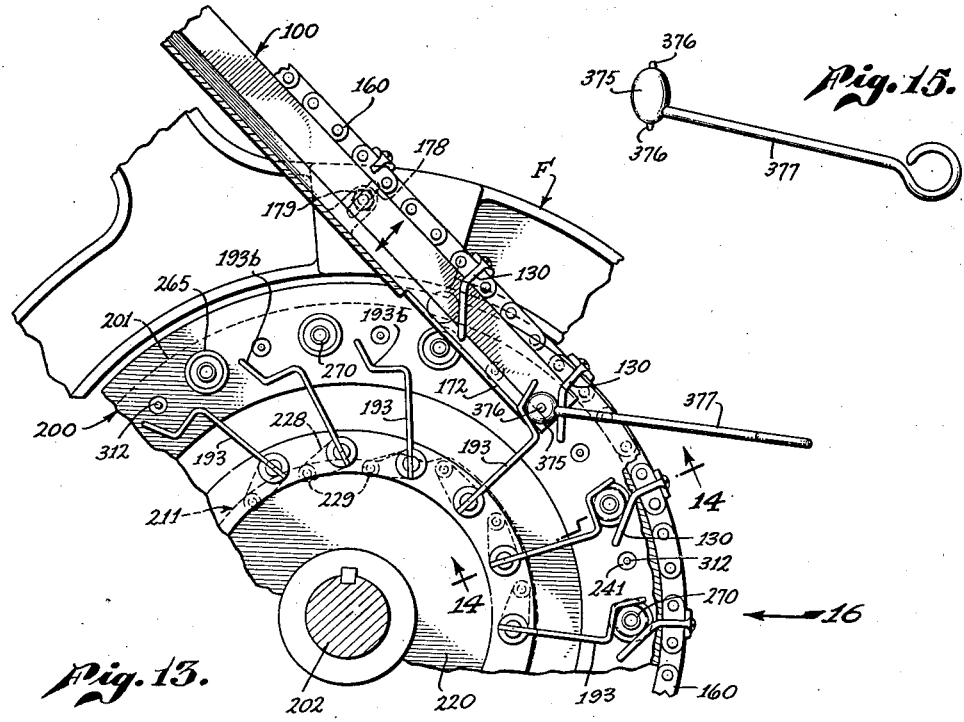
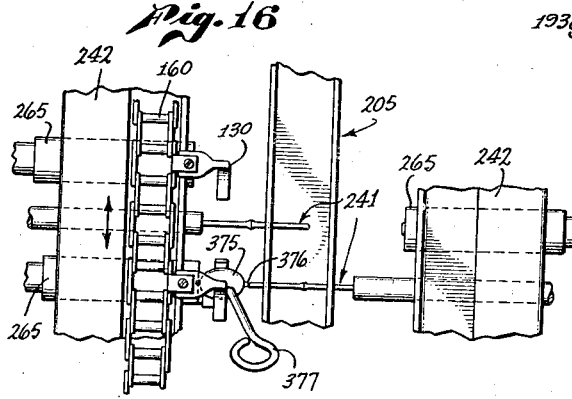
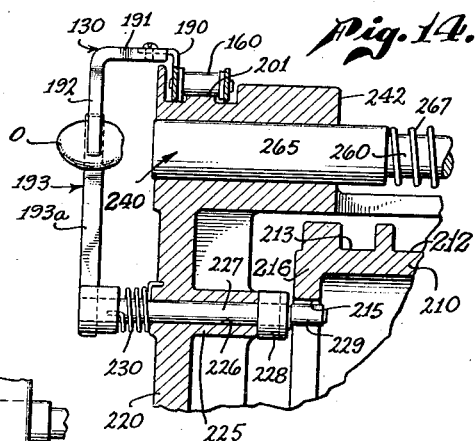
Inventors
EDWARD P. DRAKE,
FRED J. ALBERTY,
WILLIAM H. KAGLEY,
By
Attorney Patented Mar. 23, 1943

2,314,484

UNITED STATES PATENT OFFICE 2,314,484

METERING AND ALIGNING MACHINE

Edward P. Drake and Fred J. Alberty, Los Angeles, and William Herbert Kagley, Lindsay, Calif., assignors to Lindsay Ripe Olive Company, Lindsay, Calif., a corporation Application March 6, 1940, Serial No. 322,540

18 Claims. (Cl. 198—30)

This application is for improvements over the invention of the U. S. Patent No. 2,205,397 filed by Edward P. Drake, for Automatic pitting machine, and also of the U. S. Patent No. 2,246,843 filed by Edward P. Drake, for Automatic olive pitting machine.

This invention relates primarily to the fruit packing industry and to a metering and aligning device for use in connection with a mechanism to perform operations on articles of oblong shape, such for example as olives, in preparation for packing them in jars or cans. Our machine is adaptable for pitting various kinds of fruit and by our reference to olives as an illustration of its use we do not intend to limit the invention in any way. It will be obvious as the description progresses that certain features of our machine have their greatest utility in the handling of olives because of the oblong character of that fruit, but it will also be observed that the same machine or parts thereof may be employed for pitting cherries, plums, apricots, and various other fruits and for metering and aligning other articles. For convenience, however, in description and to bring out all the features of novelty and utility we will describe the machine in connection with the pitting of olives.

The machine is adapted to handling olives of different sizes but is designed to conveniently handle only one size olives at a particular setting of the machine. Inasmuch as olives are commonly graded as to size before curing, there is no practical difficulty in this feature of operation. The machine may be reset with very little trouble to handle olives of whatever grade size it is desired to put through.

In removing pits from olives it is necessary that each olive be firmly grasped in a predetermined aligned position while a punch enters from one end of the olive and is forced longitudinally therethrough, or the olive is forced against the punch by means of a die, to push the pit out through the end of the olive. In the case of olives the pit may not be struck out through the sides as to do so destroys them for the commercial purposes intended. This is because both olives and pits are oblong.

Previous machines for pitting olives have been introduced. In one of these olives are individually placed by hand in dies which hold the olives during the punching operation. The slowness, expense, and danger to the attendants of such hand fed machines make their use impractical for large scale commercial production. In the U. S. Patent No. 2,205,397, a form of automatic pitting machine is disclosed in which the olives need not be hand fed but are supplied in bulk to a hopper and are fed, aligned and positioned by the machine for the punching operation. It is believed that that is the first olive pitting machine in which bulk olives are automatically fed directly to the pit ejecting mechanism. In the other U. S. Patent noted, No. 2,246,843, certain improvements are disclosed over the earlier machine. The present application utilizes the same basis of design and operation as in the previous applications but contains a number of improvements and refinements, as well as certain additional parts which have been found to materially increase the speed and efficiency of the machine.

Objects of the invention are to provide a machine adapted to handle a continuous supply of olives which may be from boxes or any other bulk delivered into a hopper, to transfer from the hopper a continuous flow of olives to a metering device which spaces their subsequent travel, and to position the olives in the region of a die and punch mechanism.

Another object is to provide in connection with the metering device a novel tapping mechanism to retain olives in a single layer in the passages and aid in advancing them.

Another object is to provide water flow in certain olive positioning chutes, to be described, to aid in properly aligning the olives in preparation for delivery to the die and punch mechanism.

Another object is to optionally provide an auxiliary water jet to accelerate the travel of olives in the metering device.

Another obect is to provide novel means in the machine for adjusting the parts to the accommodation of olives of different size.

Other objects and advantages will appear from the further description in the specification.

In the drawings:

Figure 2 is a considerably enlarged side elevation of the hopper, feed, and metering mechanism seen from the side opposite that of Figure 1.

Figure 3 is a fragmentary section taken on line 3—3 of Figure 2 showing parts of the inclined feeding and positioning mechanism.

Figure 4 is a diagrammatic fragmentary view showing the lines of force which occur in the inclined feeding and positioning mechanism.

Figure 7 is an enlarged side view partly in section taken on the line 7—7 of Figure 6.

Figure 8 is a fragmentary sectional view taken on the line 8—8 of Figure 7.

Figure 9 is a view generally similar to Figure 7, but taken on line 9—9 of Figure 6, and showing some of the parts in different position.

Figure 10 is a chart of the cam action of the cams in the metering device.

Figure 13 is a fragmentary enlarged detail of parts shown in Figure 11, particularly illustrating the adjustment of the olive chute for different size olives.

Figure 14 is a fragmentary section taken on the line 14—14 of Figure 13.

Figure 15 is a side view of an adjusting tool.

Figure 16 is a fragmentary view taken in the direction of the arrow 16 in Figure 13, showing especially the use of the adjusting tool for centering the olive between the die and punch by adjusting the chain.

Figure 1:
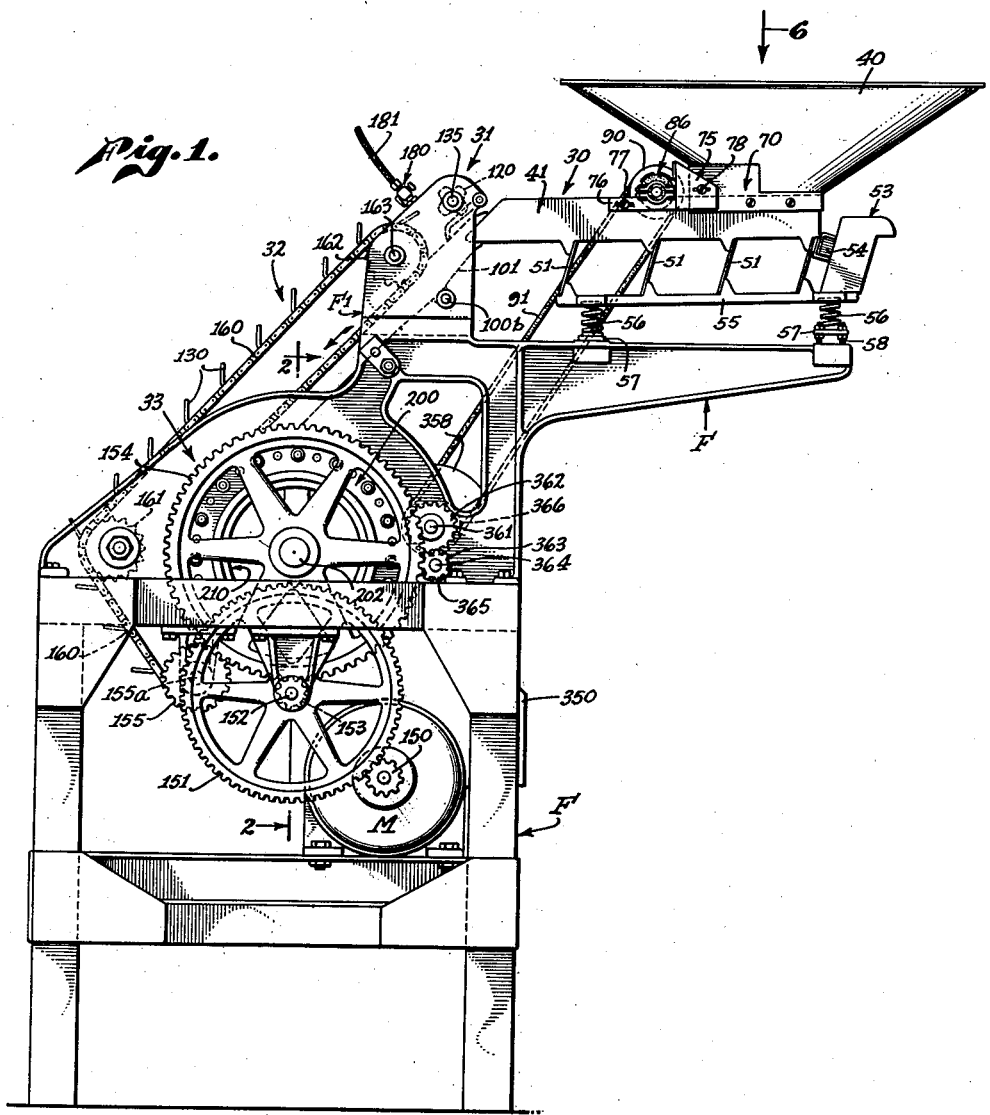
Figure 1 is a side elevation of the machine.
Figure 17:
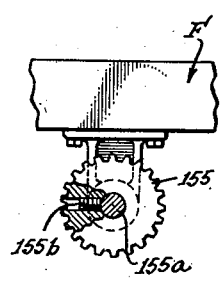
Figure 17 is a fragmentary section of the chain driving gear showing its adaptability to adjustment.

Our metering and aligning machine comprises what we have for convenience designated a metering device 31, and a spacing and positioning mechanism 32. It is shown in an environment including a feeding device 30, which is being made the subject of a divisional application, and a pitting mechanism 33, which is also being made the subject of a divisional application.

The feeding device comprises a hopper 40, the lower constricted end of which communicates with a vibrating tray 41 having a plurality of delivery passages 42.

Referring to Figure 2, the hopper is formed with a distributing partition 43 comprising a ridge 44 with sloping sides 45 and a similar sloping end 46. The sides 45 merge into the wall of the hopper following the circular contour thereof, and the end 46 extends to opposite sides of the hopper wall and terminates at its lower end in a straight edge 47, below which is thus formed a constricted passage 48 bounded above by the edge 47 and below by an inclined flat shelf member 49 which slopes downwardly and forwardly in the direction of general movement of olives through the feeding device.

The vibrating tray is formed with relatively high side walls 60, and intermediate low walls 61 defining the olive delivery passages 42. Preferably the walls 60 and 61 are parallel, and the passages or channels 42 are wide enough and deep enough to accommodate a single line of the largest olives which the machine is designed to handle. In the drawings the olives are designated O. The present machine is designed with four such delivery passages formed in the tray 41. Generally speaking, olives poured into the hopper 40 converge toward the passage 48, descending by gravity therethrough and are distributed into the four delivery passages 42.

The tray 41 is mounted upon a plurality of webs 51 slightly inclined from the vertical, which are in turn carried upon a base plate 52. The webs 51 have sufficient rigidity to support the tray in its normal elevated position, which is a generally slight downward incline toward a metering mechanism later described, but are flexible enough to permit vibration of the tray by a magnetic vibrator 53 of conventional design, the armature 54 of which is connected at 55 to one end of the tray. The base plate 52 is mounted upon coil springs 56 to isolate the vibration of the tray from main frame F. Conveniently, these springs 56 may be mounted in sockets 56' formed in cross bars 57 which are secured to the frame, the cross bar at the rear being adjustable in height above the frame by means of adjusting screws 58.

The lower end of the hopper 40, which has a rectangular configuration indicated at 70, is mounted upon the rearward end of the tray 41 by means of screws 71. This effects a unitary construction between the vibrating tray 41 and the hopper 40 which results in the hopper as well as the tray being vibrated when the device is in operation. It has been found especially advantageous to mount the hopper firmly on the vibrating tray so that the hopper derives the benefit of the vibratory action.

Mounted upon the forward portion of the rectangular section 70 of the hopper is a pair of oppositely disposed bracket members 75. These brackets are generally L-shaped in configuration, having lower longitudinal extensions 76 which are slidably positioned along the outer walls 60 of the vibrating tray. The brackets 75 are formed with slots 80 and 81 through which bolts 77 and 78 pass, the slots permitting longitudinal adjustment of the bracket member 75 on the hopper and the vibrating tray.

Mounted on the brackets 75 and extending across the vibrating tray 41 is a shear plate 85 which substantially closes the passage 48 above a roller 86 which will be described.

It is important to note that this roller is driven in the direction of the arrow in Figure 2 which is opposite the direction of the passage of the olives through the feeding mechanism. The roller is positioned and adjusted according to the size of olives so that there is room for only one layer of olives to pass between the roller and the outer end of the shelf member 49, the latter being formed with a steep decline 97 adjacent the roller 86. The purpose of the rotating roller is to back up the olives which are descending by gravity aided by vibration, and keep them in a state of movement so they will not pile up and jam in the passage 48 nor overtax the capacity of the passages 42. The combined action of the vibrating hopper, tray, and the reverse rotation of the roller 86 serve to effectively and continuously feed the olives from the hopper into the parallel individual olive passages 42.

Vibration of the tray causes the olives to travel along the delivery passages 42 toward the metering device 31 which will be next described.

The purpose of this metering device is to receive the olives from the four delivery passages, space their subsequent travel and divert them into two inclined positioning chutes or troughs 100 which are part of the spacing and positioning mechanism 32. It has been found that four of the delivery passages are advisable to assure a continuous supply of olives to two positioning chutes.

Preliminary to describing the mechanism for spacing the subsequent travel of the olives after leaving the vibrating tray it is preferable to describe a subordinate part of the metering mechanism or device through which the olives travel as they are metered and where they are diverted from the four channels or passages described into the two inclined chutes. This subordinate part of the metering device is termed a magazine numbered 101. It comprises in part a downwardly steeply inclined extension 41a of the vibrating tray 41, in which there are walls 104 forming four olive passages 42a (see Figures 6, 7 and 9) which are extensions of the passages 42 in the vibrating tray 41.

The extension 41a is preferably welded at 41b to the lower face of the vibrating tray at the forward end thereof and forms the lower part of the magazine 101. Its walls 104 rise slightly less than half of the total height of the olive passages in the magazine 101. The upper wall boundaries of the olive passages in the magazine are provided by extensioning walls 106 of the olive chutes 100. These extensions 106 are rigidly fixed to a cover 107, which is formed of one piece longitudinally slotted as at 108 to afford lateral adjustment at the upper end for the purpose of regulating the width of the magazine passages. This adjustment will be subsequently described. The material of the cover is sufficiently resilient to be sprung under action of a screw 111 which is subsequently described.

Each adjacent pair of the olive passages 42a in the magazine merges into a single open passage in the olive chutes, the latter being subsequently described in more detail.

There is no physical connection between the lower extension 41a of the vibrating tray which make up the lower part of the magazine, and the overlying extensions 106 of the olive chutes and the cover 107 which comprise the upper part of the magazine, there being a continuous vibration of the extension 41a when the machine is in operation while the upper part of the magazine remains stationary. The latter is supported on an extension F1 of the main frame F. The bottom of the passages 42a are in alignment with the troughs or channels of the olive chutes 100 but as is evident are slightly separated therefrom. Diversion of the olives from the four passages of the vibrating tray extension 41a to the two passages in the olive chutes occurs in the region of the junction between the vibrating extension 41a and the upper end or terminus of the troughs or channels of the olive chutes 100.

Referring now to the adjustment of the width of the magazine passages, which it will be recalled is for the purpose of accommodating the machine to olives of different sizes, the adjustment is obtained by the following mechanism: A lug 109 projecting upwardly from the central portion of the cover 107, it being noted that each cover 107 is divided into three sections, a central section and two outlying sections. There is a separate cover 107 for each unit of the magazine consisting of a pair of olive passages. Threaded brackets 110 are mounted with a swivel upon the outer sections of the cover 107 and an adjusting screw 111 which has its central part rotatably anchored in the lug 109 is threaded through the brackets 110 with a right hand thread on one half and a left hand thread on the other half. By means of a screw driver applied to one end of the screw 111 a turn-buckle action is thus obtained which serves to reduce or to open the slots 108 as desired, to decrease or increase the width of the olive passages. To clarify the foregoing description, it should be noted that the extending walls 106 to which the central part of the cover 107 is attached thus remain fixed while the walls 106 attached to the outer sections of the cover 107 are sprung in or out to accomplish the purposes previously described.

The metering device has four similar units, one to serve each delivery passage 42a, a complete description of one of which units will suffice.

Mounted on the extension F1 of the frame is a stationary shaft 115. Journaled to rock on this shaft is a retaining finger 116 and a cooperating holding finger 117. The finger 116 is in the form of a crank having arms 116a and 116b. On the arm 116b is a tip 116c. The tip 116c is in the form of a Z which is mounted at the end of the arm 116b by means of a bolt 118. The tip 116c may be adjustably positioned for olives of different sizes and for different working conditions by loosening the bolt 118, rotating the tip 116c to the desired position and retightening the bolt. The arm 116a is provided with a roller 119 which makes contact with a cam 120 hereinafter described. The tip 116c engages the olives in turn as they enter the passage 42a of the magazine 101, permitting them to enter one at a time into the space between the tip 116c and the holding finger 117. The rise and fall of the tip 116c, affected by action of the cam 120, secures this function. The tip 116c should be so adjusted that there is room for only one olive between the tip 116c and the finger 117. After an olive has been allowed to pass tip 116c it lodges momentarily against the finger 117.

This finger 117 is also in the form of a crank provided with an arm 125 which has a roller 126 bearing on a cam 127, later described, which causes a rise and fall of the finger 117 alternating with the rise and fall of the tip 116c.

The action of the tip 116c and the finger 117 occurs through an enlarged extension 128 of the slot 108 in the cover 107.

There being an olive lodged against finger 117, the timing of the cams is such that when tip 116c falls into the position shown in full lines in Figure 7, finger 117 rises into the position also shown in Figure 7. An olive moving into the passage 42a is thus retained there while the olive momentarily lodged against finger 117 is released and rolls downwardly by gravity and is simultaneously diverted into the chute 100 where it is caught by a spacer 130, the details of which are later described.

This action of the retaining finger 116 and the holding finger 117 prevents more than one olive at a time passing the finger 117, which is important to the subsequent handling of the olive.

Springs 131 yieldably urge the retaining finger 116 and the holding finger 117 against the respective cams 119 and 120. The springs are anchored at one end to a rod 132 which is mounted on the frame extension F1.

The cams are keyed to a shaft 135 which is journaled in the frame extension F1. Each cam is designed with two raised portions thus causing the finger it actuates to rise and fall twice with each revolution. The raised portions of the cams 120 are offset 90° from those of the cams 127, the cams being secured to the shaft 135 in pairs for the cooperative action of a unit consisting of a retaining finger 116 and a holding finger 117. The shaft 135 is driven by means to be subsequently described.

Retaining finger 116 and holding finger 117 are both formed with relatively short rearwardly extending bosses 116d and 117d respectively. In the bosses are secured tapping members 137, each of which comprises a stem 138 and a horizontal extension 139, the latter being curved upwardly toward the rear. Rocking of the fingers 116 and 117 simultaneously results in the tapping members 137 being vertically reciprocated. They are so spaced as to operate up and down in the passages 42 to prevent the piling up of olives at the junction between the passages 42 and 42a. When the tapping members are in the lowermost position there must be adequate room for a single row of olives to freely pass underneath but not room enough for any congestion of olives to occur. A rocker action is obtained which tends to push back any olives which have piled up. The taping members 137 have forward extensions 140 which keep the passages at that point continuously closed against travel of more than one row of olives at a time. The action of the tapping members is such that as they lower each time they have a slight forward movement, which tends to advance the olives.

By reference to the chart of Figure 14 the complete cam action will be clear. The timing provides alternate releasing of olives from adjacent passages 42a into the chutes 100 at a rate to deposit one olive upon each spacer 130 as the spacer passes, in a manner to be later described.

Shaft 135 and consequently cams 120 and 127 are driven by the following means: Referring to Figure 1, an electric motor M is mounted on the frame F. On the shaft of the motor is a pinion 150 meshing with a gear 151 keyed to a shaft 152. On the shaft 152 is a small gear 153 which meshes with a large gear 154. This gear meshes with a smaller gear 155, which is adjustably locked on the shaft 155a by any suitable means, such as a set screw 155b. There are two similar sprockets 156 fixed to the shaft 155a, one sprocket to accommodate each of the endless chains 160.

As has been made apparent, there are twin units of olive spacing and positioning mechanisms, each of which includes one of the chains just referred to.

Describing only one of these elements, it will be observed that driven by the sprocket 156 is the chain 160 which travels over an intermediate sprocket 161 and an upper sprocket 162. The chain can be timed (both chains being timed as one) by loosening the set screw 155b, shifting the chain and sprocket to a desired position, and retightening the set screw.

Figure 6:
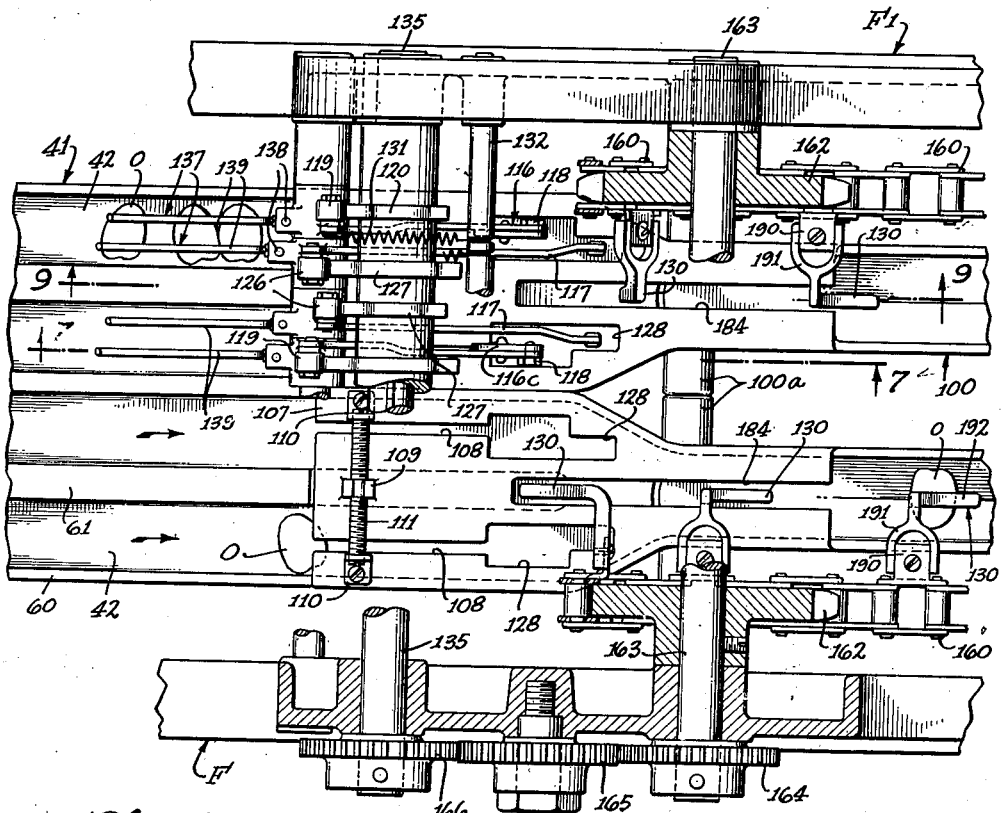
Figure 6 is a section of the metering device taken on the line 6—6 of Figure 2.

The upper sprocket 162 is fixed to a shaft 163 journaled in the frame extension F1 (see Figure 6).

There is only one shaft 163, this extending across the machine and servicing both units. At the end of shaft 163 is a gear 164 which meshes with an intermediate gear 165 and this in turn meshes with a gear 166 keyed to the cam shaft 135. The one cam shaft 135 extends across the machine and services both units.

Power from the motor is thus transmitted through the agencies mentioned to the cams 120 and 127 for the purposes already described and to other moving parts as will presently appear.

The spacing and positioning mechanism 32 begins at the upper end of the chutes 100 and includes various associated mechanism from that point in the travel of the olives until the olives have been seized by the punches and dies in the central part of the machine. It consists primarily of chutes 100, spacing means including the spacing fingers 130 and the gripping devices 193, the latter of which come into play near the lower ends of the chutes and cooperate to grip the olives and correctly hold them to be received by the dies.

The chutes are mounted at their upper ends by means of attached bosses 100a mounted on a laterally extending bar 100b which has its ends seated in lugs 100c formed on the frame extension F1. This form of mounting enables the lower ends of the chutes 100 to be raised and lowered for adjusting purposes to accommodate olives of different sizes. The lower ends of the chutes are adjustably supported by means later described.

Figure 5:
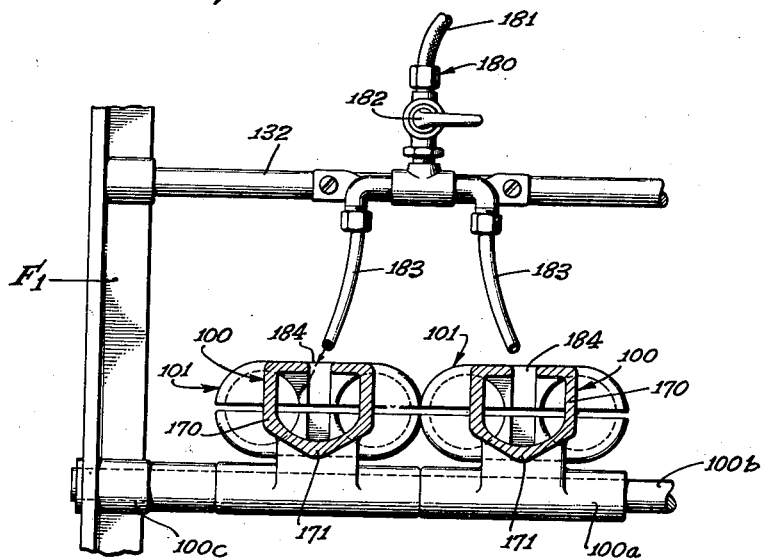
Figure 5 is an enlarged fragmentary vertical section taken on the line 5—5 of Figure 2 illustrating particularly certain water supply means later described.

The chutes each comprise a trough having vertical side walls 170 and a bottom 171 U-shaped in cross section near the upper end as in Figure 5 and feathering into a V-shaped cross section toward the lower end as in Figure 3. The width of the trough is slightly greater than the length of the largest olives to be pitted. The trough is slotted as at 172 for a distance upward from its lower end for a purpose later disclosed.

To one side of each chute is an angle iron guide bar 175 fastened to a bracket 176 on the frame F. This guide bar furnishes a track support for the upper reach of the chain 160, the chain being aligned slightly to one side of the chute 100 and parallel thereto. The lower part of the angle iron guide bar 175 is supported upon a bracket 176a which is bolted to the frame.

The lower portion of the chute 100 is supported by means of a bracket extension 177 which is bolted to the frame F. The frame is provided with a slot 178 through which the bolt 179 passes to secure the bracket extension 177, and is adjustable in the slot to afford a limited vertical adjustment of the chute.

Supported on the rod 132, which is located in the region of the metering mechanism, is a fluid supply device 180. This comprises a hose 181, a valve 182 and nozzles 183. These nozzles are positioned to direct a jet or flow of fluid through slots 184 formed in the covers 107 of the magazines. The fluid is primarily for the purpose of supplying brine or water to the chutes to facilitate the downward travel of the olives and also to hasten the alignment of the olives with their longitudinal axes crosswise of the chutes.

Secured to every third link in the chain is a spacer 130, previously referred to (see Figure 9). Each spacer consists of a bracket 190 (see Figure 3) substituted for the chain link plate on one side of the chain to which bracket is screwed for lateral adjustment a member 191 bent at an angle, the end 192 extending into the chute 100 and adapted to travel freely therein.

Olives descend in the chute, rolling and sliding behind the spacers 130. The olives seek ther most natural rolling position, and the concave bottom of the trough aids the olives to quickly assume such position, as illustrated in Figure 8. No matter what the position of each olive as it is released into the chute the configuration of the bottom of the trough, and the water flow and the length of travel to the end of the chute result in the olive invariably assuming a position with its longitudinal axis transverse of the chute as it approaches the lower end thereof.

The angle of the spacer 130 with respect to the chute has been discovered to be quite important. It has been found that an angle of approximately 45° is most satisfactory. In previous machines with the angle at approximatley 90° the center of gravity of the olive as it descends in the chute put a preponderance of weight against the spacer rather than the chute. With the more acute angle, as now described, the center of gravity is shifted and changes the bulk of friction to the chute rather than the spacers. Inasmuch as the chute with its particular configuration plays the major part in aligning the olive, shift in the center of gravity materially speeds up the alignment of the olive, and enables the present machine to be operated at a higher rate of speed than was possible in previous machines. Figure 4 diagrammatically illustrates the point under discussion.

We have found that a chute which has a V cross section its entire length will function to turn the olives crosswise in the chute most of the time, but that occasionally an olive striking the bottom of the chute squarely on one end will roll over end over end and fail to assume a crosswise position. To eliminate this possibility the upper end of the chute has a U-shaped cross section, as described. Olives rolling upon this form of chute will always topple one way or the other. As this rounded, almost flat bottom section of the chute merges into the section with the more sharply inclined walls the olives, having toppled to one side or the other, eventually end their downward journey rolling barrel-like in the chute with their axes transverse thereof.

The slot 172 is not wide enough to affect the movement or position of the olive. It does permit, however, the narrow gripper 193 to enter behind the olive and close in upon the same, the olive being then gripped between the gripper 193 and spacer 130. The gripper and spacer travel together in this relationship almost to the position where the olive is seized by the punch and die, whereupon the spacer travels on tangentially and the gripper is retracted.

Upon leaving the guide member 175 the chain 160 follows the contour of a drum 200 which is a part of the punch and die mechanism and is supported thereby on a peripheral track 201; having served its function the chain passes around sprocket 156 and returns over sprocket 161 to the upper sprocket 162.

The grippers 193 are so intimately involved with the die and punch mechanism that a detailed description of them must follow a partial description of this latter mechanism.

Referring now especially to Figures 1, 11, 12 and 13, a main shaft 202 is journaled in end bearings not shown which are carried by the frame F. This main shaft has affixed to it the gear 154, and the shaft is rotated by rotation of the gear.

On the center of the shaft is keyed a disc 205 having a hub 206 and an outer section consisting of a bifurcated annular flange 207. The bifurcations of the flange are spaced apart somewhat more than the length of an olive and have regularly spaced holes 208 and 209 in a series concentric with the axis of the disc. The holes 208 are of a diameter large enough to accommodate the passage of a punch and small enough to bar an olive. The holes 209 are large enough to accommodate a die the outer diameter of which is slightly greater than the diameter of an olive. These holes alternate in the series and the series in alternating are offset so that holes 208 in one flange are concentric with the holes 209 in the opposite flange.

Except for the gear 154 and the disc 205 the die and punch units on each side are twins and only one will be described.

Supported within the frame F is a cam barrel 210. This cam barrel remains stationary. It provides three separate cams; an internal gripper cam 211, an external die cam 212, and an external punch cam 213.

The gripper cam 211 comprises a cam race 215 of the irregular contour illustrated formed upon the inner face of an annular flange 216 which is part of the cam barrel. The physical configuration of this race may be seen in Figure 11. Its purpose is to operate and control the grippers 193.

The drum 200 is formed with an end 220 and a hub 221, the latter of which is keyed to the shaft 202 by which it is rotated.

Disposed in the end 220 concentric with the axis of the drum is a series of regularly spaced bearing lugs 225. These lugs have holes machined therein to afford bearing surfaces 226 for shafts 227 of the grippers 193.

Each gripper 193 (see Figures 12 and 13) includes an extending member 193a formed with a pocket 193b secured to and arranged to be given a partial rotation by the shaft 227. At the end of the shaft opposite the member 193a is keyed a crank 228 upon which is a roller 229 adapted to follow the gripper cam race 215. A coil spring 230 is positioned upon the outer end of the shaft 227 to urge the roller 229 toward the face of the cam race 215.

Referring back to Figure 11, it will be seen that as the drum 200 rotates carrying with it the grippers 193 the rollers on the cranks of the grippers follow the cam race 215. The grippers are thus held in a retracted inactive position until reaching the slot 172 in the chute 100 at which point the cam race recedes abruptly and permits the spring 230 to urge the gripper member 193 forward against an olive which is following one of the spacers 130. The depression in the cam extends for 62° during the travel of the roller over which the die and punch have approached to seize the olive, as later described. The cam race at that point advances slightly and opens the gripper to assure that it clears the die which has moved into the region occupied by the gripper. The cam race is further advanced to move the gripper back for clearance of the punch. The cam permits this inactive or retracted position of the gripper to be maintained to the starting point described.

Figure 12:
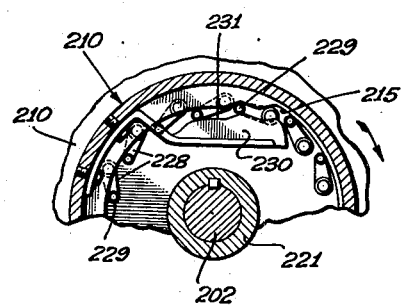
Figure 12 is a fragmentary section illustrating a part of the gripper cam.

As an auxiliary feature in the operation of the grippers a stationary cooperating cam member 230 is secured to the inner face of the barrel 210 and is formed with a cam race 231 of irregular contour designed and positioned as particularly illustrated in Figure 12 to augment the action of the springs 230 by positively and abruptly forcing the rollers 229 into engagement with the cam race 215 at the point in the evolution of the travel of the grippers where they enter the slot 172, thus assuring a rapid advancement of the grippers into the proper position for engaging the olives. This eliminates any possible tendency of the gripper action at that point to be sluggish and to interfere with the orderly and rapid handling of the olives.

The combined action of the spacers 130 and the grippers 193 serves to position the olives with their longitudinal axes in a predetermined position in the region of dies 240 and punches 241 for further operations, specifically in the illustration here, a pitting operation.

The operation of the machine is apparent from the preceding description and will be summarized briefly at this point. The operation is of course continuous. Olives placed in bulk in the receiving hopper are distributed through the discharge passage 48 by the assistance of the vibration of the hopper and traveling by gravity down the inclined floor 49 and the sharp drop 97 into the channels or passages of the vibrating tray. Packing of the olives at the restricted passage where the sharp incline 97 begins is prevented by action of the roller which it will be recalled is driven in a direction of rotation opposite to the travel of the olive. When the olives reach the metering device, olives in adjacent pairs of passages are alternately deposited in the positioning chutes. Climbing or packing of the olives in the region where they are approaching the spacing fingers of the metering device is prevented by the tapping members 137 which due to their rocker like configuration and relatively rapid tapping movement push back any olives which have a tendency to pile up.

The vibration of the hopper, the tray and the olive chutes of the metering device is important in facilitating the uninterrupted supply of olives to the metering device as well as the periodic release of olives from the latter.

While traveling down the inclined chutes after leaving the metering device the olives, which it is noted are now properly spaced for synchronous and successive delivery to the punching mechanism, are caused to assume a position with their individual axes parallel to the drums by the action which is imparted by the design on the bottom of the chutes assisted by the contact of the olives with the spacers 130. Rapid positioning of the olives is also assisted by the water flow which was described, and also by the design of the spacers 130 in relation to the olive chutes, the relative angle being such that the center of gravity of the olives is preponderant on the chutes rather than on the spacers.

Figure 18:
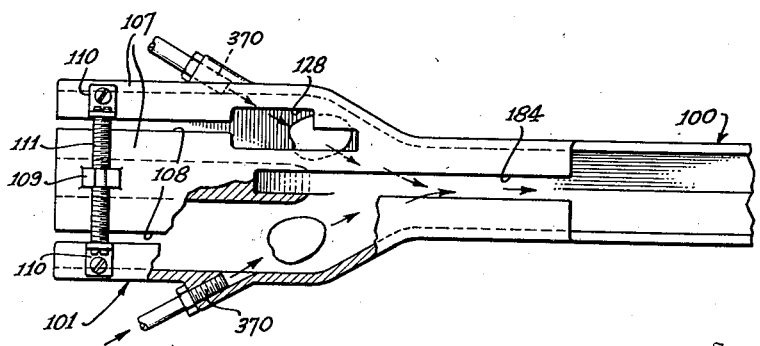
Figure 18 is a fragmentary view in plan of the upper end of an inclined olive chute illustrating an optional provision of inclined water jets which are employed primarily for the purpose of speeding up movement of the olives.
Figure 11:
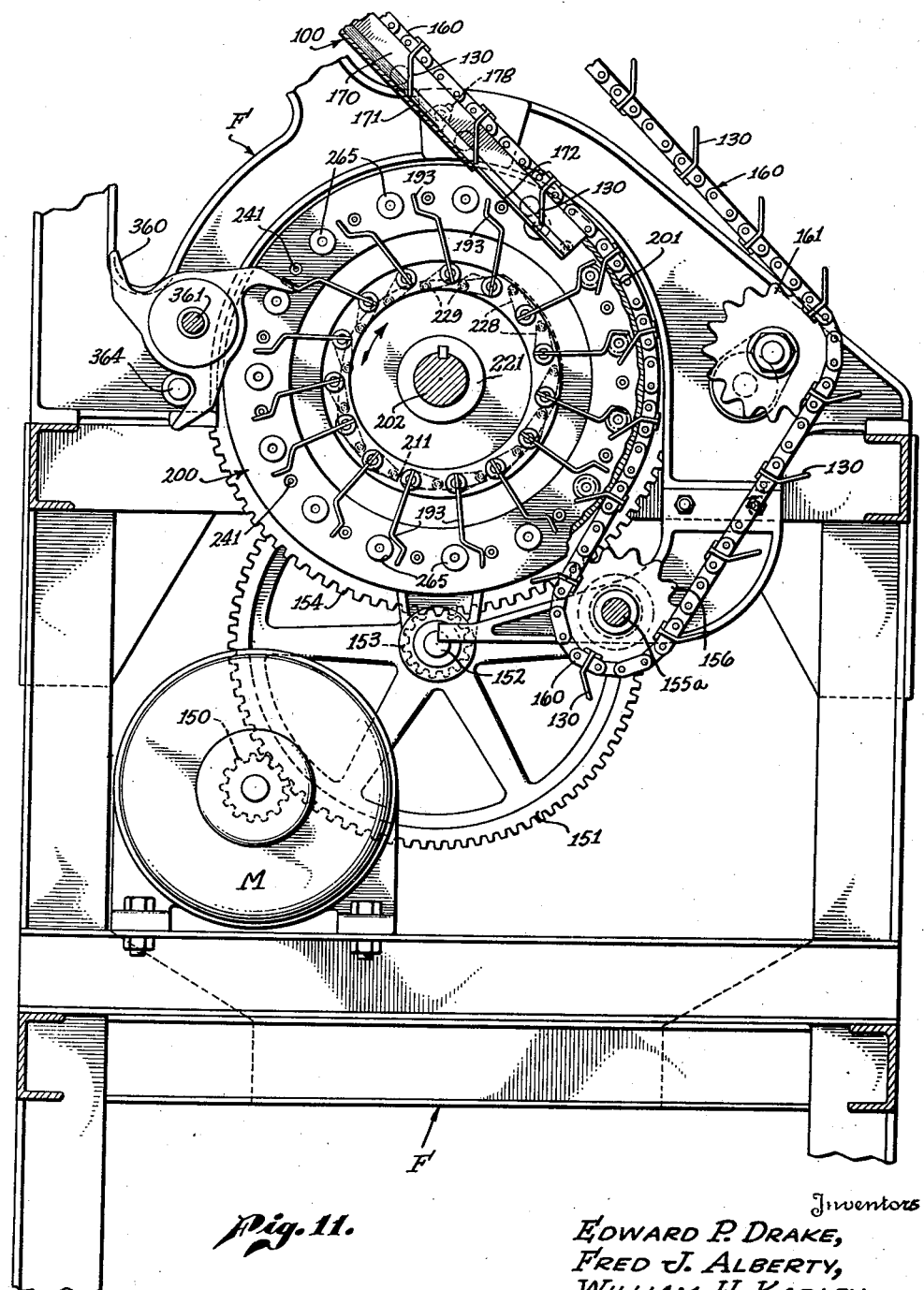
Figure 11 is a section looking in the direction opposite that of Figure 1, showing the central and lower portion of the machine.

The rate of travel of the olives may be further increased if desired by providing auxiliary water jets as indicated in Figure 18 where water is shown being supplied under pressure through nozzles 370 at a point where the olives are released by the metering mechanism and travel from adjacent pairs of chutes or passages alternately to a single chute, the angle of the spray being such as to rapidly propel the olives toward the single chute.

At the lower end of the chutes the grippers on the drum cooperate with the spacers to hold the olives and bring them into line with the punches and dies.

One of the very important features of the present invention is its adaptability to different sized olives. A few relatively minor adjustments can be made on the machine quickly and easily to accommodate whatever size olives comprises the next batch to be run through. It is not, of course, contemplated that this machine can practically operate on a batch of olives of assorted sizes. It is, however, common practice in the handling and packing of all fruits, and especially of olives, to grade them into sizes of uniform dimensions before cooking, packing or curing them. In the case of olives, the longitudinal dimension is ignored, although as a general rule olives having the same transverse diameter will have the same length.

The necessary adjustments for handling olives of different sizes will be outlined starting at the input end of the machine.

Assuming in the previous description that olives of a given size have been handled and the next batch is to be larger olives, the roller 86 and associated parts must be shifted slightly away from the hopper to provide a larger passage. This is done by loosening screws 78, sliding the roller carriage along the slots 80 and 81 and re-tightening the screws. The next adjustment is of the tip 116c on the retaining finger 116. This is done by loosening the nut 118 rotating the part 116c slightly to provide for a larger spacing between that member and the holding finger 117, and retightening the nut. No adjustment of the size of the passages 42 is needed because these are already large enough to hold any size olives which will normally be put through the machine. It is, however, necessary in the present contingency to widen the olive passages 42a in the magazines which is done by applying a screw driver to screws 111 and turning in the proper direction to shift the outer parts of the covers 107 of the magazines.

The spacers 130 require no adjustment relative to the chain on which they are mounted. They do require, however, to be slightly advanced so that when the spring operated grippers come into play to hold the olives against the spacers the longitudinal axis of the olives will be aligned with the axes of the punches and dies. The timing is done by loosening the set screw 155b, in gear 155, slightly rotating the sprocket 156 by hand to the desired point, and retightening the set screw 155b, see Figure 31.

It is also necessary in case of the larger olives to slightly lower the lower end of the inclined chute S100. This is accomplished by loosening the bolt or screw 179 and shifting the chute downwardly in the slot 178, then tightening the bolt. It will be recalled that the upper ends of the chutes are pivotally mounted on the cross bar 100b to facilitate the adjustment last described.

We have devised a novel adjusting tool which is separately illustrated in Figure 15. It consists of a metal member 375 having the physical proportions of an olive and is provided with cylindrical nipples 376 at each end of the longitudinal axis thereof. A handle 377 attached to the body 375 at an angle facilitates the use of the device. We provide a series of these tools corresponding to the different grades or sizes of olives which are to be handled in the machine.

The tool is used in the manner illustrated in Figure 13. By grasping the handle of the tool, the simulated olive is placed in position between the spacer 130 and the finger 193. The nipples 376 are held in alignment with the axes of a cooperating punch and die and while so held, the chutes are adjusted as described, and the chain may be then turned as described so that the combined action of the spacer and finger will hold the olive in the correctly aligned position.

Obviously if olives smaller than that contemplated in the principal description of this invention is to comprise the next batch going through the machine, the same parts which have been described as being readjusted for larger olives would have to be readjusted in the opposite direction or manner for the smaller olives. All parts not particularly mentioned as requiring adjustment will perform that function universally on whatever size fruit the machine is called upon to handle.

What we claim as our invention is:

1. In a fruit pitting machine, the combination of: an inclined tray having a fruit passage therein of width sufficient for only a single row of fruit, means to vibrate the said tray to cause the fruit to move downwardly through the said passage, a metering mechanism positioned and adapted to receive the fruit from the said passage and space it for subsequent travel, a tapping member adjacent the delivery end of the said fruit passage adapted to intermittently engage the fruit on its upper surface to prevent a piling up of the fruit entering into the metering mechanism, and means to reciprocate the said tapping member.

2. An apparatus as described in claim 1 in which the tapping member is formed with an extension having an upward flare toward the receiving end of the tray.

3. An apparatus as described in claim 1 in which the tapping member is mounted on a rocker arm, and means to rock the said arm whereby a compound vertical and rotational reciprocation as imparted to the tapping member for pushing back and down into the vibrating tray any fruit which tends to climb and simultaneously imparting a forward and downward thrust to the fruit adjacent the forward end of the tapping member.

4. In a fruit pitting machine, a vibrating tray for conveying fruit in single rows from a bulk supply, a metering mechanism adjacent the delivery end of the tray for receiving fruit from the vibrating tray and conveying it in individual spaced relationship for further treatment comprising a magazine having lower and upper parts, the lower part being formed by an extension on said vibrating tray having an inclination greater than the angle of inclination of the vibrating tray, the upper part being a stationary cooperating closure member positioned over the said tray extension and combining therewith to provide substantially closed fruit channels, the closure member being formed with slots in the upper face thereof, and cooperating retaining fingers and holding fingers positioned to extend through the said slots, means to alternately raise and lower the said retaining fingers and holding fingers whereby fruit entering the said channels is released individually and intermittently for further handling.

5. In a fruit pitting machine, a vibrating tray for conveying fruit in single rows from a bulk supply, a fruit spacing and positioning mechanism adjacent the delivery end of the tray for receiving fruit from the vibrating tray and conveying it in individual spaced relationship for further treatment comprising cooperating retaining fingers and holding fingers positioned to engage the fruit, means to alternately raise and lower the said retaining fingers and holding fingers whereby fruit engaged by them is released individually and intermittently for further handling, a tip adjustably mounted on the lower end of the retaining fingers to increase or decrease the effective length of the said fingers whereby more or less space is provided between the fruit engaging ends of the retaining fingers and the holding fingers for handling fruit of different sizes.

6. An apparatus as described in claim 5 in which there are tapping members positioned in advance of the retaining fingers and holding fingers to intermittently engage the fruit on its upper surface to prevent a piling up of the fruit passing on towards the said fingers, and means to reciprocate the said tapping members.

7. In a fruit pitting machine, a vibrating tray for conveying fruit in single rows from a bulk supply, a fruit spacing and positioning mechanism adjacent the delivery end of the tray for receiving fruit from the vibrating tray and conveying it in individual spaced relationship for further treatment comprising cooperating retaining fingers and holding fingers positioned to engage the fruit, means to alternately raise and lower the said retaining fingers and holding fingers whereby fruit engaged by them is released individually and intermittently for further handling, a tip adjustably mounted on the lower end of the retaining fingers to increase or decrease the effective length of the said fingers whereby more or less space is provided between the fruit engaging ends of the retaining fingers and the holding fingers for handling fruit of different sizes, bosses on the retaining fingers and on the holding fingers, tapping members mounted on said bosses and positioned in advance of the retaining and holding fingers to intermittently engage the fruit on its upper surface to prevent a piling up of the fruit passing on toward the said fingers, the said tapping members alternately reciprocating with the movements of the respective fingers on which they are mounted.

8. In a fruit pitting machine for handling oblong fruit in which there is a metering mechanism, a spacing and positioning mechanism succeeding the metering mechanism for spacing, conveying and positioning individual pieces of the oblong fruit delivered by the metering mechanism, the spacing and positioning mechanism comprising an inclined chute down which the fruit may roll, whereby the fruit in its downward progress will seek its natural rolling position so that the longitudinal axes of the fruit lie across the chute, a traveling member adapted to move in a path adjacent and parallel to the chute, spacing fingers carried by the traveling member and extending into the chute and being adapted to therein engage individual pieces of fruit to cooperate with the chute by retarding the progress of the fruit to increase the aligning action in a given distance of travel and to maintain the pieces of fruit in spaced position for subsequent handling, the spacing fingers while traveling through the chute occupying positions at an acute angle to the inclination of the chute to cause the center of gravity of the fruit to lie closer to the chute than to the fingers whereby the aligning action is accelerated.

9. An apparatus as described in claim 8 in which there is a means to cause a flow of fluid to be introduced into the upper end of the chute to accelerate the downward travel of the fruit toward the spacing fingers and the rapid alignment thereof with the longitudinal axes crosswise of the chute.

10. In a fruit pitting machine for handling oblong fruit in which there is a metering mechanism, a spacing and positioning mechanism succeeding the metering mechanism for spacing, conveying and positioning individual pieces of the oblong fruit delivered by the metering mechanism, the spacing and positioning mechanism comprising an inclined chute down which the fruit may roll, whereby the fruit in its downward progress will seek its natural rolling position so that the longitudinal axes of the fruit lie across the chute, a traveling member adapted to move in a path adjacent and parallel to the chute, spacing fingers carried by the traveling member and extending into the chute and being adapted to therein engage individual pieces of fruit to cooperate with the chute by retarding the progress of the fruit to increase the aligning action in a given distance of travel and to maintain the pieces of fruit in spaced position for subsequent handling, means to cause a flow of fluid to be introduced into the upper end of the chutes to accelerate the downward travel of the fruit toward the spacing fingers and the rapid alignment thereof with the longitudinal axes crosswise of the chute.

11. In a machine for performing operations on oblong fruit in which the pieces of fruit must be positioned with their longitudinal axes lying in a common direction, an inclined chute down which the fruit may roll, whereby the fruit in its downward progress will seek its natural rolling position along its true diameter so that the longitudinal axes of the fruit lie across the chute, spacing fingers extending into the chute, and means to cause the said fingers to travel through the chute, the fingers while traveling through the chute occupying positions at an acute angle to the inclination of the chute, said fingers being adapted to engage individual pieces of fruit retarding the progress of same and causing the center of gravity of the fruit to lie closer to the chute than to the fingers whereby the aligning action is accelerated.

12. An apparatus as described in claim 11 in which there is means to cause a flow of fluid to be introduced into the upper end of the chute to accelerate the downward travel of the fruit toward the fingers and the rapid alignment thereof with the longitudinal axes crosswise of the chute.

13. In a machine of the character described, a fruit passage, a spacing mechanism comprising cooperating retaining fingers and holding fingers positioned and adapted to alternately reciprocate to receive fruit from the passage and space it for subsequent travel, a tapping member positioned in advance of the spacing mechanism above the said fruit passage and adapted to intermittently engage the fruit on its upper surface to prevent a piling up of the fruit entering the spacing mechanism, and means to reciprocate the said tapping member.

14. In a machine of the character described, a fruit passage, means to convey fruit therethrough, a tapping member above said passage and positioned adjacent thereto adapted to intermittently engage fruit passing through said passage on its upper surface to prevent a piling up of the fruit, and means to reciprocate said tapping member, said tapping member being of such length and mounted so that it superimposes a plurality of pieces of fruit in said passage with a diminishing clearance toward the outgoing end.

15. In a machine of the character described, a fruit passage, means to convey fruit therethrough, a tapping member above said passage and positioned adjacent thereto adapted to intermittently engage fruit passing through said passage on its upper surface to prevent a piling up of the fruit, said tapping member being formed with an upward flare extending opposite the direction of travel of the fruit, and means to reciprocate said tapping member, said upward flare being of a greater length than the fruit upon which it normally operates.

16. In a machine of the character described, a fruit passage, means to convey fruit therethrough, a tapping member above said passage and positioned adjacent thereto adapted to intermittently engage fruit passing through said passage on its upper surface to prevent a piling up of the fruit, said tapping member being mounted on a rocker arm and being of such length and mounted so that it superimposes a plurality of pieces of fruit in said passage with a diminishing clearance toward the outgoing end, and means to rock the said arm.

17. In a machine of the character described, a vibrating tray for conveying fruit from a bulk supply, a mechanism for further conveying the fruit in single rows comprising a magazine adjacent the delivery end of the vibrating tray, a chute extending from the magazine, said magazine having lower and upper parts, the lower part being formed by an extension on said vibrating tray having an inclination greater than the angle of inclination of the vibrating tray, and the upper part being a stationary cooperating closure member having downwardly extending walls and positioned over the said tray extension and combining therewith to provide substantially closed fruit channels, the said closure member forming an extension of the said chute.

18. An apparatus as described in claim 17 in which the closure member includes a slotted plate with spring characteristics, and means to reduce or increase the width of said slots whereby to adjust the effective width of the fruit channels in the magazine to pass fruit of different seizes.

EDWARD P. DRAKE.
FRED J. ALBERTY.
WILLIAM HERBERT KAGLEY.